United States Patent [19]
Saitoh et al.

[11] 3,985,650
[45] Oct. 12, 1976

[54] METHOD FOR SEPARATING PLASTICS-CONTAINING MIXTURE

[75] Inventors: Kozo Saitoh, Tokyo; Sumio Izumi, Sayama, both of Japan

[73] Assignee: Mitsui Mining & Smelting Co., Ltd., Tokyo, Japan

[22] Filed: Mar. 25, 1975

[21] Appl. No.: 561,761

[30] Foreign Application Priority Data
Mar. 25, 1974 Japan............................ 49-33303
Mar. 25, 1974 Japan............................ 49-33304

[52] U.S. Cl................................ 210/44; 209/166; 241/15
[51] Int. Cl.²........................................ B03D 1/00
[58] Field of Search.................. 210/44, 73, 83, 65, 210/221 P, 221 R, 221 M; 136/174, 165; 209/3, 166, 2, 162–165, 167; 241/14, 15, 24

[56] References Cited
UNITED STATES PATENTS

| | | | |
|---|---|---|---|
| 2,378,152 | 6/1945 | Nagelvoort | 209/2 |
| 3,074,653 | 1/1963 | Schorsch | 241/24 |
| 3,224,582 | 12/1965 | Iannicelli | 209/166 |
| 3,284,282 | 11/1966 | Immel | 241/15 |
| 3,822,015 | 7/1974 | Hsieh et al. | 210/221 P |
| 3,841,916 | 10/1974 | Marchetti | 136/174 |

FOREIGN PATENTS OR APPLICATIONS

| | | | |
|---|---|---|---|
| 675,058 | 1/1966 | Belgium | 136/174 |

*Primary Examiner*—Charles N. Hart
*Assistant Examiner*—Benoit Castel
*Attorney, Agent, or Firm*—Sughrue, Rothwell, Mion, Zinn and Macpeak

[57] ABSTRACT

A method for separating a plastics-containing mixture comprising a lead alloy, a polyolefin, a polystyrene and ebonite, which comprises (1) separating the lead alloy from the mixture in a running liquid, with the lead alloy being recovered as a residue; (2) placing the resulting plastics mixture comprising the polyolefin, polystyrene and ebonite in a separation cell containing an aqueous liquid medium in the presence of a wetting agent; (3) introducing gas bubbles into the cell thereby to cause the gas bubbles to selectively adhere to the surface of the polyolefin and float the polyolefin, with the polyolefin being recovered as a float; (4) adding a flotation agent into the cell containing the resulting plastics mixture comprising the polystyrene and ebonite; and (5) introducing gas bubbbles into the cell thereby to cause the gas bubbles to selectively adhere to the surface of the polystyrene and float the polystyrene, with the polystyrene being recovered as a float and the ebonite being recovered as a residue.

17 Claims, No Drawings

METHOD FOR SEPARATING PLASTICS-CONTAINING MIXTURE

BACKGROUND OF THE INVENTION

1. Field of the Invention

This invention relates to a method for separating a plastics-containing mixture which comprises a lead alloy, a polyolefin, a polystyrene and ebonite.

2. Description of the Prior Art

Hitherto, a method for separating a plastics-containing mixture, such as a waste battery of a motorcar which comprises a lead alloy, plastics and the like in a continuous manner on an industrial scale has not yet been known since the separation of such a mixture is very difficult to carry out. The only known method for separating such a mixture is a separation into the lead alloy and the other materials by a heavy media process or a manual separation. However, even in these methods, the plastics-containing mixture from which the lead alloy has been separated can not be reused in industry and, therefore, the plastics-containing mixture have hithertofore been disposed of.

SUMMARY OF THE INVENTION

The present invention is to provide a method for separating a mixture comprising a lead alloy, a polyolefin, a polystyrene and ebonite into each component on an industrial scale with high efficiency.

As a result of investigation on separation of the plastics-containing mixture comprising a lead alloy, a polyolefin, a polystyrene and ebonite as described above, the present inventors found a novel method in which the above-described mixture can be easily separated into each component by utilizing physical properties and surface properties of each of components contained in the mixture in an aqueous liquid medium. That is, according to the method of this invention, the lead alloy is first separated from the plastics-containing mixture in a running liquid using the difference in specific gravity, and the resulting mixture is further subjected to a separation, by taking advantage of a difference in wettability of the surfaces of the plastics and ebonite in the presence of a wetting agent and a flotation agent to separate the plastics and ebonite in the aqueous liquid medium whereby the flotation and the separation can be effectively carried out while introducing gas bubbles which selectively adhere to the surface of the material to be floated in the order of the material having a higher hydrophobicity.

DETAILED DESCRIPTION OF THE INVENTION

The method of this invention comprises (1) first separating a lead alloy from a plastics-containing mixture comprising a lead alloy, a polyolefin, a polystyrene and ebonite, in a running liquid, with the lead alloy being recovered as a residue; (2) placing the resulting plastics mixture comprising the polyolefin, the polystyrene and ebonite in a separation cell containing an aqueous liquid medium in the presence of a wetting agent; (3) introducing gas bubbles into the cell thereby to cause the gas bubbles to selectively adhere to the surface of the polyolefin and float the polyolefin, with the polyolefin being recovered as a float; (4) adding a flotation agent into the cell containing the resulting plastics mixture comprising the polystyrene and ebonite; and (5) introducing gas bubbles into the cell thereby to cause the gas bubbles to selectively adhere to the surface of the polystyrene and float the polystyrene, with the polystyrene being recovered as a float and the ebonite being recovered as a residue.

The lead alloys which can be separated in the present invention include a lead metal, a lead-antimony alloy, a lead-antimony-arsenic alloy and the like which are hereinafter referred to as "lead alloy" for simplicity.

The polyolefins which can be separated in the present invention include plastics which can be obtained by polymerizing or copolymerizing an olefin monomer or a mixture of olefin monomers, and are exemplified by polyethylene and polypropylene.

The polystyrenes which can be separated in the present invention include plastics which can be obtained by polymerizing or copolymerizing a styrene monomer, and are exemplified by polystyrene, an acrylonitrile-butadiene-styrene (ABS) resin, an acrylonitrile-styrene (AS) resin and the like.

The ebonite which can be separated in the present invention is a hard rubber which can be obtained by vulcanizing a raw rubber with sulfur.

In the method of this invention, the shape and size of these materials which can be separated are not particularly limited, but from the standpoint of handling and economy, the size of the materials treated preferably is about 10 mm or less.

In the method of this invention, the comminuted materials of the above-described mixture are first separated in the running liquid into the lead alloy and the other materials by taking advantage of the difference in specific gravity of these materials. In this separation step, a well known separation technique using an elutriator where a liquid current flows upwardly, a hollow cone, a cyclone where a liquid current flows in a circle, a separating tank having mechanical impellers where the liquid current flows in a circle and upwardly, a jig where the liquid flows in pulse, a table which reciprocates horizontally, a spiral classifier, a rake classifier, a bowl classifier, or the like which mechanically scratches up the solid, a trough separator, a hamphrey spiral and the like can be effectively employed. Further, in this separation step, water is generally used as the running liquid, but sea water, brine, aqueous solutions and the like can also be used.

When the waste battery is employed as the raw material, this material generally contains a small amount of pastes of lead compounds and other materials in addition to a lead alloy, plastics and ebonite. However, there is no problem to proceed in the separation of the lead alloy from the other plastics materials even when the pastes and other materials are present in the raw material. Further, it is also advantageous in this invention that the raw material to be separated is screened using a screen before subjecting the raw material to the separation according to the method of this invention so as to remove the pastes and other materials passing through the screen. Thus, by separating the lead alloy from the raw material, the precipitation of the lead alloy can be prevented in the flotation cell where the subsequent separations of the materials other than the lead alloy are carried out and in the conduit between the cells and the clogging of the flow of the resulting pulp-like material can also be prevented with a result of good efficiency in operation.

The resulting materials from which the lead alloy has been separated are subsequently subjected to the next separation. The separation comprises two separation steps. In the first separation, the polyolefin is separated from a mixture of the polystyrene and the ebonite, and in the second separation, the mixture of the polystyrene and the ebonite obtained in the first separation step are separated from each other. The procedures which can be used in the first and second separations are hereinafter described in greater detail.

In the first separation step, the polyolefin can be floated in the aqueous liquid medium in the presence of a wetting agent while introducing gas bubbles. The wetting agent functions as selectively increasing the hydrophilicity of the surfaces of the polystyrene and the ebonite and thus enable to float the polyolefin. Examples of wetting agents which can be used include sodium lignin sulfonate, calcium lignin sulfonate, tannic acid, a quebracho extract, gelatin, glue, saponin and the like. The wetting agent can be used individually or as a mixture thereof. A suitable amount of the wetting agent employed ranges from about 10 to 500 g, preferably 10 to 200g, per ton of the mixture to be treated. When the amount of the wetting agent is less than about 10 g, the selective flotation of the polyolefin can not be effectively conducted. On the other hand, when the amount of the wetting agent exceeds about 500 g, the flotation of the polyolefin tends to be depressed. After addition of the wetting agent, stirring is preferably employed for several minutes, e.g., about 1 to 10 minutes.

Subsequently, the second separation step is carried out on the residue from which the polyolefin has been separated as a float in the first separation step. In this second separation step, the polystyrene is floated in the presence of a flotation agent while introducing gas bubbles and simultaneously the ebonite is obtained as a residue. Examples of flotation agents which can be used include pine oil, cresylic acid, eucalyptus oil, camphor oil, a derivative of a higher alcohol, methylisobutyl carbinol, pyridine, o-toluidine and the like. The flotation agent can be used alone or as a mixture thereof. A suitable amount of the flotation agent employed ranges from about 10 to 700 g, preferably 50 to 300 g, per ton of the mixture to be treated in the second separation step. When the amount of the flotation agent is less than about 10 g, the flotation of the polystyrene tends to be incomplete. On the other hand, when the amount of the flotation agent exceeds about 700 g, no additional flotation effect can be realized over the use of about 700 g of the flotation agent and, therefore, it is not advantageous from the standpoint of economy.

When the raw material is contaminated with oils and the like, it is more advantageous to wash the surfaces of the plastics to be treated with an alkylaryl sulfonate, an alkyl sulfonate, a sulfuric acid ester of a higher alcohol and the like while stirring and then to subject the washed material to the first and second separation steps. A suitable amount of these additives is less than about 1,000 g per ton of the raw material charged.

In the method for separating the plastics and the ebonite, an aeration is conducted in a manner well known in conventional flotation procedures such as, for example, mechanically stirring the aqueous liquid medium, bubbling a gas through the aqueous liquid medium, release of gases dissolved under pressure in the aqueous liquid medium, vacuum evacuation to release gases dissolved in the aqueous liquid medium, electrolysis of the aqueous liquid medium or a combination these methods. The gases which can suitably be used include air, oxygen, nitrogen, carbon dioxide, inert gases such as argon, etc.

The shape of the cell used in the separation process of this invention can be, for example, a well known tetragonal, regular or non-regular polygonal or circular type, and also can be a trough type, a thickener type or a cyclone type.

A suitable proportion of the mixture of the plastics and the ebonite in the aqueous liquid medium ranges from about 1 to 20 parts, preferably 2 to 6 parts, per 100 parts by weight of the aqueous liquid medium. The aqueous liquid medium is generally used at room temperature (e.g., about 20° to 30° C), but warm water of, e.g., about 30° to 60° C, can also be used to accelerate the flotation of the plastics.

In the flotation method of the present invention, water is generally used as the aqueous liquid medium, but salt water can also be used. Suitable examples of salt water include sea water, brine, bittern-containing water as well as aqueous solutions containing halides such as $NaCl$, $CaCl_2$, $MgCl_2$, $MgBr_2$, etc., sulfates such as $MgSO_4$, $CaSO_4$, $K_2SO_4$, $Na_2SO_4$, etc., and bicarbonates such as $Ca(HCO_3)_2$, $NaHCO_3$, etc.

The pH of the aqueous liquid medium used in the method of this invention can vary over a wide range, but the preferred range is about 5 to 6. Furthermore, the aqueous liquid medium used in this invention can contain inorganic or organic substances which are found in river water, industrial water, etc., without impairing the separation results obtained.

After completion of the flotation, each of the floats is recovered by scraping out, and the final residue is also recovered with a tail medium. The thus recovered materials can be permitted to reuse.

According to the present invention, the lead alloy is first separated and collected from the mixture comprising the lead alloy, the polyolefin, the polystyrene and the ebonite, and the remaining materials are then subjected to an industrial separation into each component with high efficiency by a flotation method which is characterized by controlling the wettability of each of components in the aqueous liquid medium in the presence of the wetting agent and flotation agent. The operation of the method is simple, and the treatment is inexpensive. Moreover, the method lends itself to a continuous treatment of large quantities of plastics-containing mixtures. Accordingly, the method of this invention is quite valuable as a method for the separation of waste plastics-containing mixtures, thereby permitting the separated materials to be recovered and reused.

The present invention is further illustrated in greater detail by referring to the following Examples, but the Examples are not to be construed as limiting the scope of this invention. Unless otherwise indicated, all parts, percents, ratios and the like are by weight.

EXAMPLE 1

A waste battery of a motorcar was comminuted into a size of 10 mm or less, and screened using a screen of 20 mesh to remove materials such as pastes, etc., which passed through the screen, and to take the material remaining on the screen as a raw material. This raw material was found to contain 65 parts of a lead alloy containing grids, terminals, etc., 10 parts of polypropylene as a polyolefine, 15 parts of a total amount of ABS resin and AS resin as a polystyrene, and 10 parts of ebonite.

The apparatus for separating a lead alloy from the mixture was a cylindrical vessel having a diameter of 20 cm and a height of 30 cm, in which a vertical rotary axis was provided in the center portion to which an impeller was attached so as to be placed near the inside bottom.

Into the vessel was charged 500 g of the above-described raw material and water was filled followed by rotating the axis. Since a specific gravity of the lead alloy was much larger than that of other materials, the lead alloy sank at the bottom of the vessel even in the stirring-running liquid, and the sunk lead alloy can be discharged from the vessel through a small hole provided at the bottom of the vessel by opening a cock. After a 7 minutes stirring, most of the lead alloy contained in the raw material was collected.

On the contrary, materials having a remarkably smaller specific gravity than that of the lead alloy were dispersed in a middle to upper portion of the vessel by running water. An outlet was provided in a height of 25 cm from the bottom of the vessel and water was fed into the vessel so as to maintain a liquid level. From this outlet, the materials from which the lead alloy had been separated were discharged outside the vessel and collected.

The materials from which the lead alloy had been separated as described above were then placed in a rectangular flotation cell containing 8,000 ml of water, and 60 g of a quebracho extract was added into the cell per ton of the materials placed followed by introducing gas bubbles thereinto for 7 minutes to obtain polypropylene as a float and the materials other than polypropylene as a residue. The polypropylene was then recovered.

Subsequently, 200 g of camphor oil was added into the cell containing the above-described residue per ton of the residue followed by introducing gas bubbles thereinto for 5 minutes to float ABS resin and AS resin and to obtain ebonite as a residue. As a result, it was found that the purities of polypropylene, a mixture of ABS resin and AS resin, and ebonite exceeded 95%, respectively. These separated plastics and ebonite were permitted to be reused. The plastics and ebonite employed in this Example were different in color from each other so that the results of the separation could be easily determined by naked eyes.

In the same manner as described above, a raw material containing polyethylene in addition to the polypropylene as a polyolefin was also separated into a mixture of polypropylene and polyethylene, the polystyrene and the ebonite with high quality.

EXAMPLE 2

300 g of a mixture of 50 parts of ABS resin and 50 parts of ebonite each having a size of 10 mm or less, which was obtained as a residue in a similar manner as described in Example 1 was placed in a rectangular flotation cell containing 8,000 ml of water.

Subsequently, gas bubbles were introduced into the cell for 7 minutes to obtain 148.5 g of a float having an ABS resin-purity of 99.7% and 151.5 g of a residue having an ebonite-purity of 98.4%. In order to determine the results of the separation obtained with ease by naked eyes, the separated materials which were different in color from each other were employed.

Further, when 30 g of eucalyptus oil was further added to the cell per ton of the mixture, the flotation of ABS resin was accelerated and completed for 3 minutes.

To a mixture of polystyrene and ebonite or a mixture of a styrene-acrylonitile (AS) resin and ebonite, the method according to this invention can be applied to obtain the almost same results as described above.

While the invention has been described in detail and with reference to specific embodiments thereof, it will be apparent to one skilled in the art that various changes and modifications can be made therein without departing from the spirit and scope thereof.

What is claimed is:
1. A method for separating plastics-containing mixture from waste batteries or the like comprising a lead alloy, a polyolefin, a polystyrene and ebonite, which comprises (1) comminutating said mixture into a size of about 10mm or less; (2) separating the lead alloy from the mixture in a running liquid comprising water, sea water, brine or aqueous solutions, with the lead alloy being recovered as a residue; (3) placing the plastics mixture from which the lead alloy has been separated in a separation cell containing an aqueous liquid medium in the presence of a wetting agent in the amount of 10 to 500g per ton of mixture to be treated, said wetting agent being selected from the group consisting of sodium lignin sulfonate, calcium lignin sulfonate, tannic acid, a quebracho extract, gelatin, glue and saponin; (4) introducing gas bubbles into the cell thereby to cause the gas bubbles to selectively adhere to the surface of the polyolefin and float the polyolefin, with the polyolefin being recovered as a float; (5) adding a flotation agent in the amount of at least 10g per ton of mixture to be treated into the cell containing the plastics mixture from which the polyolefin has been separated, said flotation agent being selected from the group consisting of pine oil, cresylic acid, eucalyptus oil, camphor oil, a derivative of a higher alcohol, methylisobutyl carbinol, pyridine and o-toluidine; and (6) introducing gas bubbles into the cell thereby to cause the gas bubbles to selectively adhere to the surface of the polystyrene and float the polystyrene, with the polystyrene being recovered as a float and the ebonite being recovered as a residue.

2. The method of claim 1, wherein said lead alloy is a lead metal, a lead-antimony alloy or a lead-antimony-arsenic alloy.

3. The method of claim 1, wherein said polyolefin is polyethylene or polypropylene.

4. The method of claim 1, wherein said polystyrene is polystyrene, an acrylonitrile-butadine-styrene (ABS) resin or an acrylonitrile-styrene (AS) resin.

5. The method of claim 1, wherein the proportion of said polyolefin, polystyrene and ebonite in said aqueous liquid medium is about 1 to 20 parts by weight of said aqueous liquid medium.

6. The method of claim 1, wherein said wetting agent is a quebracho extract.

7. The method of claim 1, wherein the proportion of said wetting agent in said aqueous liquid medium ranges from about 10 to 200 g per ton of said plastics mixture.

8. The method of claim 1, wherein said separation is carried out at a temperature of from about 20° to 60° C.

9. The method of claim 1, wherein said running liquid is water or salt water.

10. The method of claim 1, wherein said running liquid is salt water and said salt water is sea water, brine, bittern-containing water or an aqueous solution of a halide, a sulfate or a bicarbonate.

11. The method of claim 1, wherein the proportion of said flotation agent in said cell ranges from about 50 to 300g per ton of said plastics mixture.

12. The method of claim 1, wherein said flotation agent is, eucalyptus oil.

13. The method of claim 1, wherein said flotation agent is camphor oil.

14. The method of claim 1, wherein said flotation agent is pine oil.

15. The method of claim 1, wherein said wetting agent is sodium lignin sulfonate.

16. The method of claim 1, wherein said wetting agent is calcium lignin sulfonate.

17. The method of claim 1, wherein said wetting agent is tannic acid.

* * * * *